73-40.5 SP
2/4/86 OR H 000,034

United States Statutory Invention Registration [19]

[11] Reg. Number: H34
[45] Published: Mar. 4, 1986

Werling

[54] AIRCRAFT CABIN PRESSURIZATION CONTROL SYSTEM TESTER

[75] Inventor: Kevin J. Werling, New Haven, Ind.

[73] Assignee: The United States of America as represented by the Secretary of the Air Force, Washington, D.C.

[21] Appl. No.: 622,047

[22] Filed: Jun. 19, 1984

[51] Int. Cl.[4] ..... C05B 1/00
[52] U.S. Cl. ..... 73/40.5 R
[58] Field of Search ..... 73/4

[56] References Cited

U.S. PATENT DOCUMENTS

| | | | |
|---|---|---|---|
| 2,679,753 | 6/1954 | Flamm | 73/115 |
| 3,156,113 | 11/1964 | Dollar | 73/116 |
| 3,418,843 | 12/1968 | Bosshart | 73/37 |
| 3,580,050 | 5/1971 | Waldron | 73/37 |
| 3,747,404 | 7/1973 | Novak | 73/168 |
| 4,092,865 | 6/1978 | Strybel | 73/756 |
| 4,109,536 | 8/1978 | Strybel | 73/756 |
| 4,375,162 | 3/1983 | Eppley | 73/4 |
| 4,380,166 | 4/1983 | Crombie | 73/4 |

FOREIGN PATENT DOCUMENTS

| | | | |
|---|---|---|---|
| 854021 | 11/1960 | United Kingdom | 73/4 |

*Primary Examiner*—Salvatore Cangialosi
*Assistant Examiner*—Ian J. Lobo
*Attorney, Agent, or Firm*—Donald J. Singer; Bobby D. Scearce

[57] ABSTRACT

An aircraft cabin pressure control system tester includes a first tester component having a vacuum pressure-sensing gage which indicates the static atmosphere in inches of Hg and a second tester component having a differential pressure-sensing gage which indicates the pressure/vacuum in inches of $H_2O$. When the components of the tester are connected respectively in communication with lines connecting the controller of the system to static atmosphere ports and a pressure regulator valve, the tester can be used to determine which one, if any, of the pressure controller, air compressor and regulator valve of the pressure control system is faulty.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

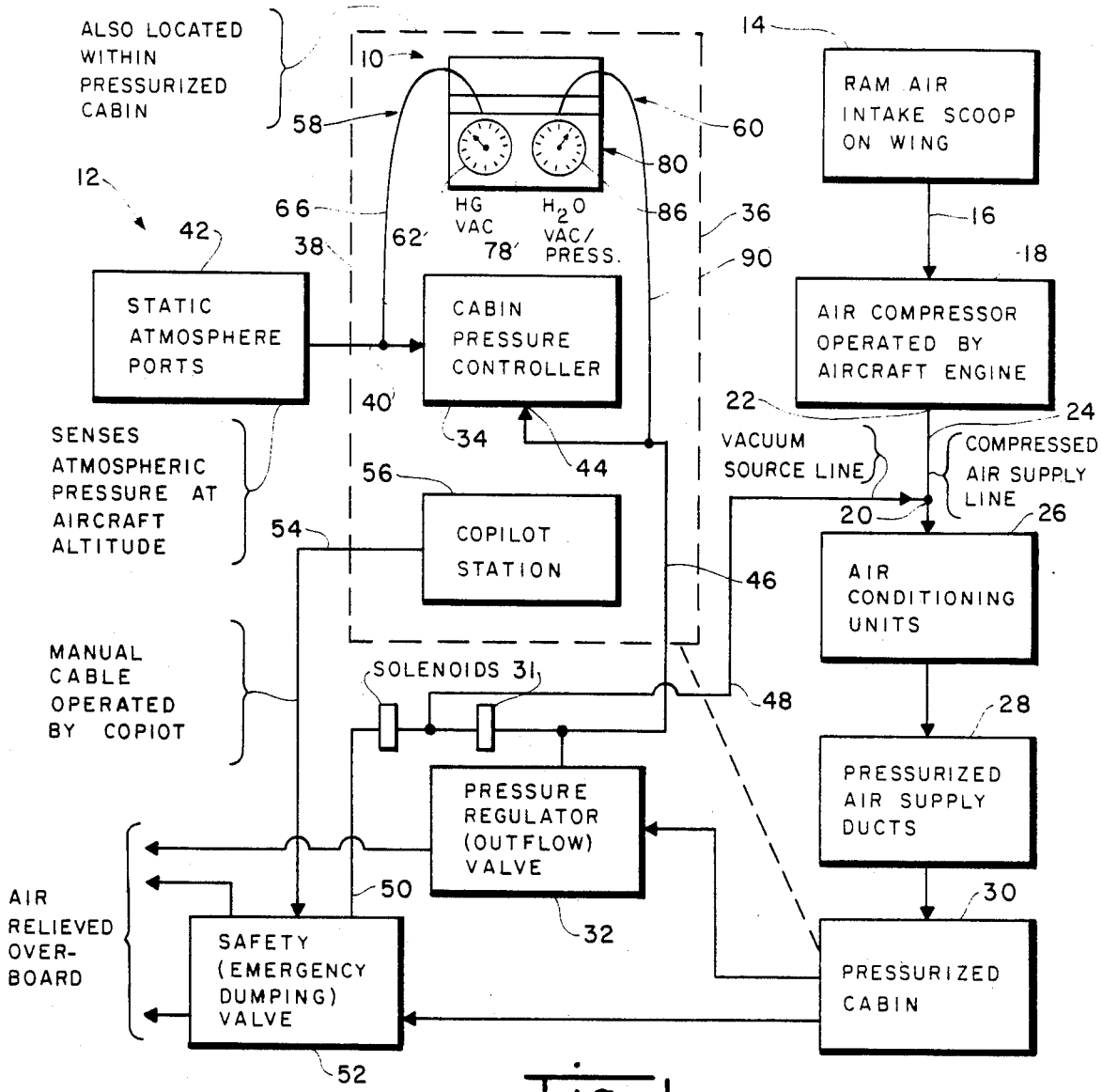
Fig. 1
Fig. 2
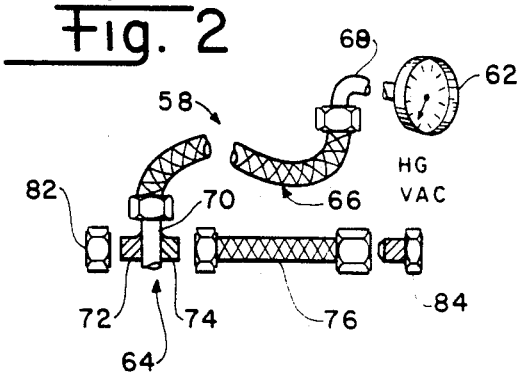
Fig. 3
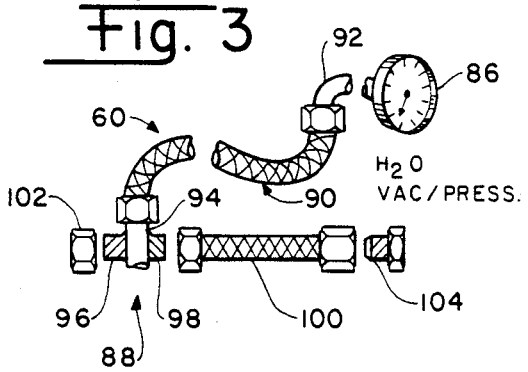

AIRCRAFT CABIN PRESSURIZATION CONTROL SYSTEM TESTER

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to troubleshooting of aircraft cabin pressure control systems and, more particularly, is concerned with a tester which utilizes a pair of gages for determining the source or cause of a pressurization discrepancy in such control sytems.

2. Description of the Prior Art

It is conventional practice to pressurize an aircraft cabin to maintain a near sea level pressure therein. In a typical cabin pressure control system, such as found in Convair 340, 440 and 580 aircraft, air outside of the aircraft is routed to an air compressor which, in turn, forces it through air conditioning units to air ducts which deliver the pressurized air to the cabin. The air delivered to the cabin is constantly being relieved overboard by operation of a regulator valve. However, the regulator valve restricts the outflow of the cabin air to provide pressurization of the cabin. Control of the regulator valve by a pressure controller of the system establishes the pressure differential that is maintained during flight. Thus, the pressure controller permits selection of the pressure altitude at which the cabin will be maintained during flight. In the Convair aircraft, normal operation of the pressure controller causes the rate of airflow to vary from 73 pounds per minute at sea level to 65 pounds per minute at 20,000 feet, which is sufficient to change the air in the cabin approximately once every two minutes and provide a maximum pressure differential of 4.16 psi.

Heretofore, there was no satisfactory way to troubleshoot the pressurization control system without first removing the compressor and/or pressure controller from the aircraft to test them and without the aid of a specialized tester being available. Consequently, for quite some time, a need has existed for a convenient technique for troubleshooting the cabin pressure control system without having to first remove the suspected source of the problem to test it.

SUMMARY OF THE INVENTION

The present invention provides an aircraft cabin pressure control system tester designed to satisfy the aforementioned needs. The tester utilizes a pair of gages capable of being connected to the cabin pressure control system as an aid in troubleshooting the cause of a pressurization discrepancy. More specifically, a first gage is connected between static atmosphere ports on the aircraft and the inlet side of the pressure controller. While a second gage is connected between the outflow pressure regulator valve and the outlet side of the controller. The source of a pressurization problem is indicated by which one of the gages is reading zero. If the first gage is reading zero, this means that the controller is not sensing static atmosphere and the static atmosphere ports are plugged. If the first gage has a positive reading, but the second gage has a negative reading, this indicates that the controller or the compressor is faulty. An excess vacuum reading indicates a faulty controller. An excess pressure reading indicates a faulty compressor. If both of the gages are indicating the correct readings, then the regulator valve may be faulty.

Accordingly, the present invention is directed to an aircraft cabin pressure control system tester, which comprises the combination of: (a) a first tester component including a first vacuum pressure-indicating gage, a first coupler for interconnection in flow communication with the control system and first flexible hose for connecting the first gage in flow communication with the first coupler: and (b) a second tester component including a second differential pressure-indicating gage, a second coupler for interconnection in flow communication with the control system and second flexible hose for connecting the second gage in flow communication with the second coupler. The tester also includes a tool box having a top shelf in which the first and second gages are mounted for display of their readings when a lid of the tool box is open. The flexible hoses are connected to the gages from inside of the box so that the hoses and couplers can be stored in the box and its lid closed during nonuse.

The present invention is also directed to a method of testing an aircraft cabin pressure control system wherein the system includes an aircraft cabin, an air compressor for supplying pressurized air to pressurize the aircraft cabin, a cabin pressure regulator value for relieving cabin air to the exterior of the aircraft, a pressure controller connected at one inlet port in communication with static atmosphere ports on the exterior of the aircraft and at another outlet port with the cabin pressure regulator valve for operating the same.

The steps of testing method includes: (a) connecting a first vacuum pressure-sensing gage at the one port of the controller: (b) connecting a second differential pressure-sensing gage at the other port of the controller: (c) reading the first gage: (d) reading the second gage: and (e) based on a comparison of the respective readings, determining which of the air compressor, pressure controller and regulator valve, if any, is faulty. If the reading of the first gage is zero, then the static atmosphere ports are plugged. If the reading of the first gage is positive while the reading of the first gage is negative, then the controller or compressor is faulty. An excess vacuum reading indicates a faulty controller. While an excess pressure reading indicates a faulty compressor. If the readings of both gages are at expected levels, but the cabin pressure is not at its expected level, then the regulator valve may be faulty.

BRIEF DESCRIPTION OF THE DRAWINGS

FIG. 1 is a schematic representation of an aircraft cabin pressure control system with the tester of the present invention interconnected thereto for troubleshooting the operation of the air compressor, pressure controller and pressure regulator valve of the system.

FIG. 2 is an exploded view of one component of the tester.

FIG. 3 is an exploded view of the other component of the tester.

DETAILED DESCRIPTION OF THE PREFERRED EMBODIMENT

IN GENERAL

Referring now to the drawings, and more particularly to FIG. 1, there is shown the tester of the present invention, generally designated 10, being depicted in schematic form connected to an aircraft cabin pressure control system, generally indicated as 12 and being depicted in block diagram form. The cabin pressure control system 12, being conventional per se, includes a ram air intake scoop 14 located outboard of an engine nacelle (not shown) in the leading edge of the aircraft wing (not shown). Air to be pressurized enters the scoop 14 and is ducted in supply line 16 to a primary air compressor 18 mounted on and driven by an engine (not shown) of the aircraft. The compressor 18 draws air through the scoop 14 and at its outlet 22 forces the air in compressed air supply line 24 through various air conditioning units 26 to the air ducts 28 which deliver the pressurized air to the cabin 30 (including the flight compartment). Additionally, compressed air in supply line 24 is drawn across negative pressure inlet 20 to provide vacuum due to communication via negative pressure line 48 to the inlets of both electric solenoids 31.

However, the air entering the cabin 30 is constantly being relieved overboard by a pressure regulator valve 32 located in the aft end of the cabin. The regulator valve 32 creates pressurization of the cabin air by restricting the rate of outflow of the air from the cabin 30 relative to the rate of inflow of air into the cabin.

A cabin pressure controller 34 of the system 12 located in the flight compartment 36 is adjustable for selecting the pressure altitude at which the cabin will be maintained during flight and for controlling the action of the regulator valve 32 and thereby the rate of change of the cabin altitude. The pressure controller 34 is connected at its inlet port 38 in communication via line 40 with one or more static atmosphere ports 42 on the exterior of the aircraft through which the controller senses the atmospheric pressure at the particular altitude of the aircraft. At a outlet port 44, the controller is connected in communication via line 46 with the pressure regulator valve 32. At the controller 34, a vacuum or negative pressure is created by operation of the air compressor 18 due to communication via line 46 from the regulator valve 32 and communication with static atmosphere ports 42 due to communication via line 40. The degree to which the controller 34 passes this vacuum condition through to the regulator valve 32 determines the rate at which the valve relieves air from the cabin overboard.

Finally, to assure cabin pressure relief during flight conditions requiring a higher rate of change in pressurization than can be provided by the regulator valve 32, such as during descent and emergency conditions, a safety valve 52 is provided in the control system 12. The safety valve 52 is also connected to the pressurized cabin 30 and can be manually operated via a cable 54 which connects the valve to the copilot's station 56. Vacuum operation of the safety valve 52 is provided due to communication via line 50 with solenoid 31 and communication via line 48 to the negative pressure inlet 20.

CABIN PRESSURE CONTROL SYSTEM TESTER

Turning now to FIGS. 2 and 3 as well as continuing to refer to FIG. 1, there is shown the preferred embodiment of the tester 10 of the present invention. The tester 10 includes a first tester component 58 shown in FIG. 2 and a second tester component 60 shown in FIG. 3.

The first tester component 58 includes a first gage 62 capable of measuring vacuum pressure, for instance, in inches of Hg, a first coupler 64 for interconnecting in flow communication the first tester component 58 with the control system 12, and a first flexible hose 66 for connecting the first gage 62 in flow communication with the first coupler 64. The first flexible hose 66 is connected at one end by an elbow 68 to the first gage 62. The first coupler 64 includes a hollow tee 70 connected at the other end of the hose 66. The tee 70 also has aligned threaded opposite ends 72,74. The end 74 is assembled to a first hose section 76. The first gage 62 of the tester 10 is mounted in a front wall 78 of a tool box 80 and the first flexible hose 66 is connected to the back side of the gage 62 from the inside of the box. When the tester is not being used, a cap 82 and a plug 84 are fitted respectively on the end 72 of the tee 70 and the end of the hose section 76. Then, the first coupler 64 and first flexible hose 66 are stored in the box 80.

The second tester component 60 includes a second, pressure differential gage 86 capable of measuring vacuum or pressure, for instance, in inches of $H_2O$, a second coupler 88 for interconnecting in flow communication the second tester component 60 with the control system 12, and a second flexible hose 90 for connecting the second gage 86 in flow communication with the second coupler 88. The second flexible hose 90 is connected at one end by an elbow 92 to the second gage 86. The second coupler 88 includes a hollow tee 94 connected at the other end of the hose 90. The tee 94 also has aligned threaded opposite ends 96,98. The end is connected to a second hose section 100. Like the first gage 62, the second gage 86 is also mounted in the top shelf 78 of the tool box 80 and the second flexible hose 90 is connected to the back side of the second gage from the inside the box. When the tester is not being used, a cap 102 and a plug 104 are fitted respectively on the end 96 of the tee 94 and the end of the hose section 100. Then, the second coupler 88 and second hose 90 are stored in the box 80.

When placed in use, the respective caps 82,102 and plugs 84,104 are removed from the tees 70,94 and tube sections 76,100 of the first and second tester components 58,60. The tee end 72 and free end of the tube section 76 of the first tester component 58 are interconnected in line 40, while the tee end 96 and free end of the tube section 100 of the second tester component 60 are interconnected in line 46. In such manner, the first gage 62 is connected to the inlet port 38 of the controller 34, and the second gage 86 is connected to the outlet port 44 of the controller 34. By comparing the readings of the two gages, one can determine which of the air compressor 18, pressure controller 34 and the regulator valve 32, if any, is faulty. If the reading of the first gage 62 is zero, then the static atmosphere ports 42 are plugged. If the reading of the second gage 86 is zero (or negative) while the reading of the first gage is positive, then the compressor 18 or controller 34 if faulty. An excess vacuum reading indicates that the controller 34 is faulty. An excess pressure reading indicates that the compressor 18 is faulty. If both readings are adequate, and something is wrong with the pressurization of the cabin, then by the process of eliminating the compressor and controller, the regulator is the only one left. So, in the latter instance, it would be the faulty one.

It should be understood that, alternatively, the gages may both be pressure/vacuum-sensing in inches of Hg or in inches of $H_2O$. In the specific embodiment illustrated herein, the controller happened to be rated on one side in Hg and on the other side in $H_2O$.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A portable tester for an aircraft cabin pressure control system including a cabin pressure controller having an inlet operatively connected to a port open to the atmosphere and an outlet operatively connected to a pressure regulator valve for regulating pressure within said cabin, said tester comprising:

a. a first pressure-indicating gage, a first coupler for interconnection in flow communication with said inlet of said controller of said control system and a first flexible hose means for connecting said first gage in flow communication with said first coupler for measuring air pressure at said inlet;

b. a second pressure differential-indicating gage, a second coupler for interconnection in flow communication with said outlet of said controller of said control system and a second flexible hose means for connecting said second gage in flow communication with said second coupler for measuring air pressure at said outlet; and c. a tool box having a lid and a top shelf within which said first and second gages are mounted in side-by-side relationship and readable from outside said box when said lid is open, said first and second flexible hose means being operatively connected to said respective gages from inside said box such that said couplers and flexible hose means can be stored in said box when said tester is not being used.

* * * * *